April 21, 1970    A. TALEFF ETAL    3,507,137
WINDING MACHINE

Filed March 1, 1968    3 Sheets-Sheet 2

United States Patent Office 3,507,137
Patented Apr. 21, 1970

3,507,137
WINDING MACHINE
Alexander Taleff, Pittsburgh, and Chauncey G. Robinson, Monroeville, Pa., assignors to Westinghouse Electric Corporation, Pittsburgh, Pa., a corporation of Pennsylvania
Filed Mar. 1, 1968, Ser. No. 709,736
Int. Cl. B21c 47/00
U.S. Cl. 72—148             16 Claims

ABSTRACT OF THE DISCLOSURE

A winding machine for winding electrical coils of sheet material, including a rotatable, disc shaped carriage, means for supporting the carriage in a substantially vertical position, and drive means for rotating the carriage. A plurality of pay-off spindles are rotatably mounted on the carriage, at predetermined spaced circumferential positions, with the rotational axes of the spindles and carriage being parallel to each other. A mandrel is disposed at the rotational axis of the carriage, with the electrical coil being wound on the mandrel from rolls of sheet material disposed on the spindles, as the carriage is rotated by the drive means about the mandrel.

BACKGROUND OF THE INVENTION

Field of the invention

The invention relates in general to a winding machine for winding coils for electrical inductive apparatus, such as power transformers, and more particularly to winding machines for winding electrical coils of sheet material.

Description of the prior art

In the prior art, winding machines for manufacturing electrical coils of sheet material rotate a mandrel and pull the sheet material from a roll, through a friction clamp. The friction clamp develops the strip tension necessary to obtain a coil having the desired shape and space factor. In order to provide a coil having the required current carrying capacity, it is common in power transformers to wind several layers of sheet conductor simultaneously, using a common friction clamp to provide the desired sheet tension, or providing a separate friction clamp for each sheet. The several layers of sheet conductor are connected in parallel after the winding step is completed.

Since it is less costly to manufacture and assemble a magnetic core having rectangularly shaped leg members, instead of leg members having a cruciform cross section, it is preferable to use cores with rectangular leg assemblies. However, the coils must then have rectangular openings, in order to closely couple the rectangular legs of the magnetic core. Thus, the sheet conductor must be bent to conform to the inner rectangular opening provided by a rectangular mandrel having the desired coil opening or window dimensions.

Prior art winding machines have several disadvantages. For example, turning the mandrel to overcome the tension in the sheet material requires massive gear reduction. The problem is compounded when a plurality of layers of sheet conductor are to be wound together, as the strip tension of each must be overcome, making it difficult to anchor the mandrel and the tensioning means. Thus, serious alignment and deflection problems are usually inherent in the apparatus. Further, the sheets or strips of conductive material are not of controlled tension in the coil, due to inter-strip friction caused by the differences in the length of each of the simultaneously wound strips. Winding several strips or sheets simultaneously also makes it difficult to bend the strips uniformly and compactly at each change in coil contour. The mandrel is stopped each quarter turn, on a rectangularly shaped coil, and the sheets manually hammered to provide the desired corner bends. This increases the manufacturing time and cost for each coil, and still results in a coil having less than the optimum shape and space factor.

The friction type tension means, which apply the necessary tension to the sheets to obtain a predetermined space factor, may bend or deform the sheet due to the friction between the tension means and sheet, and they are completely unsuitable for use with sheet conductors insulated with a coating of insulating material disposed thereon, as the coating may be damaged by the relative movement between the sheet and the friction tension means.

Therefore, it would be desirable to provide a new and improved winding machine which is capable of winding a plurality of sheet conductors into an electrical coil, while balancing the forces on the mandrel, which provides a uniform tension in all of the sheets of conductive material, which automatically provides the necessary bends in the sheet materials at the changes in coil contour, without manually shaping the coil by an operator, and which provides the desired sheet tension without relative motion between the sheet material and the portion of the tensioning means in contact with the sheet material.

SUMMARY OF THE INVENTION

The present invention is a new and improved winding machine for winding sheet conductors, in which the rolls of sheet material are moved about a stationary mandrel. The rolls of sheet material are disposed on a plurality of spindles, rotatably mounted on a substantially disc shaped carriage. The carriage is vertically supported on rollers which contact its outer periphery at predetermined points, and drive means is disposed to rotate the carriage by contacting the carriage near its outer periphery. Driving the disc shaped carriage from a point near its outer periphery inherently provides the gear reduction necessary for the drive means to obtain the torque required to overcome the tension in the sheet materials and wind the sheet conductors about the mandrel. The plurality of spindles, and the tension means for providing the tension in the sheet materials, are circumferentially spaced about the carriage to balance the forces on the mandrel, and to circumferentially space the points of contact of the sheet material on the coil build from one another, as the sheet materials are wound about the mandrel. This arrangement simplifies the mounting of the mandrel, overcoming the deflection and alignment problems of the prior art, and it facilitates the bending of each sheet conductor about the coil contour.

The tension means for developing the desired tension in the sheet materials includes a plurality of slip belts disposed on opposite sides of the sheet conductor. The sheet conductor is clamped in the tension means, with the slip belts moving with the sheet as the sheet is pulled therethrough. The friction developed is between the slip belts and backup wear plates, and not between the sheet materials and the slip belts. This allows strip type conductors having a coating of insulation disposed thereon to be used without danger of damaging the insulating coating.

The straightness of the wind is controlled by edge control means, which senses the edges of the sheets of material being wound on the mandrel, and controls the axial location of the spindles in response thereto, to provide the desired tracking.

BRIEF DESCRIPTION OF THE DRAWINGS

Further advantages and uses of the invention will become more apparent when considered in view of the following detailed description and drawings, in which.

DESCRIPTION OF PREFERRED EMBODIMENT

Figure 1:
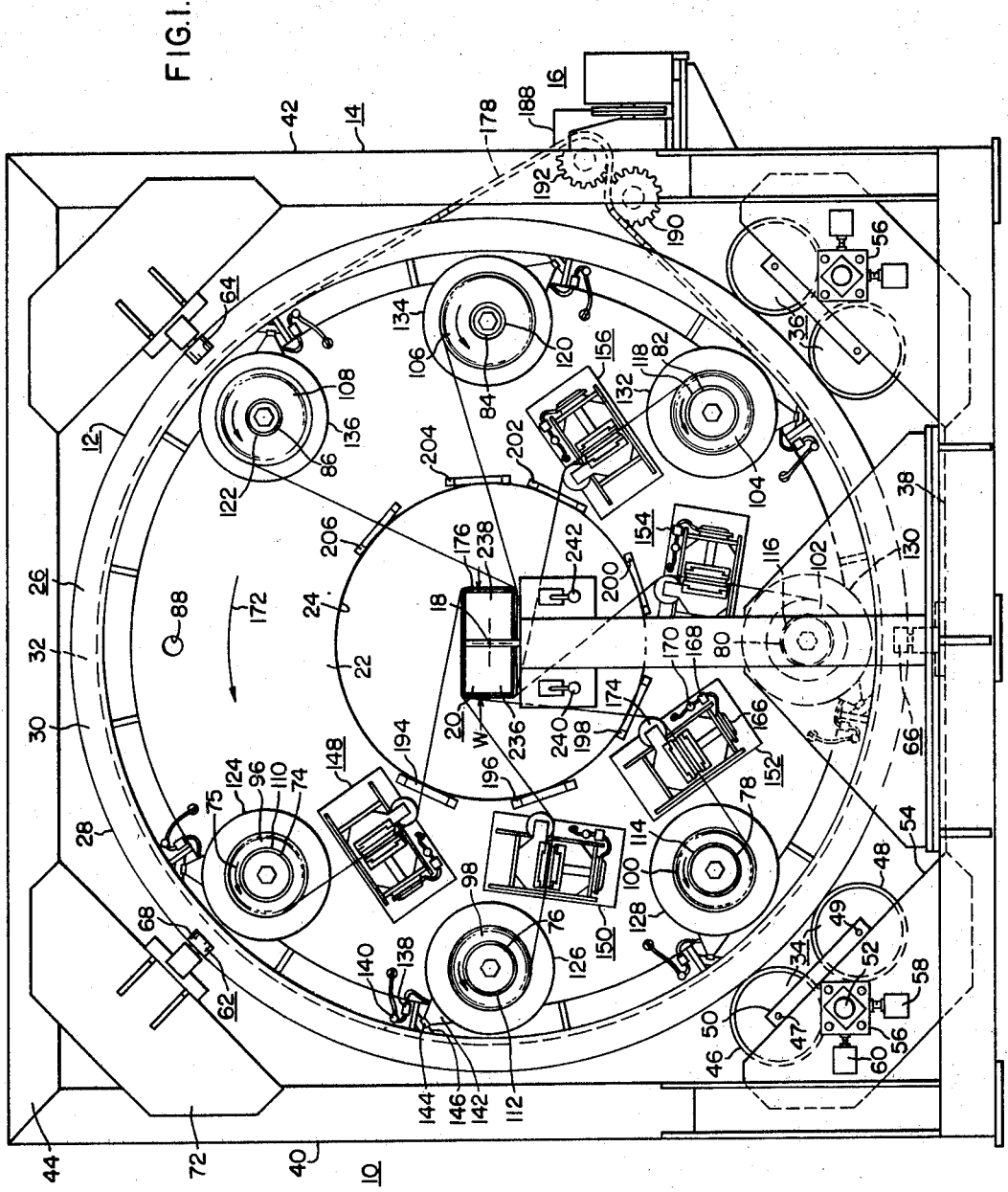
FIG. 1 is a front elevational view of a coil winding machine constructed according to the teachings of the invention.
Figure 2:
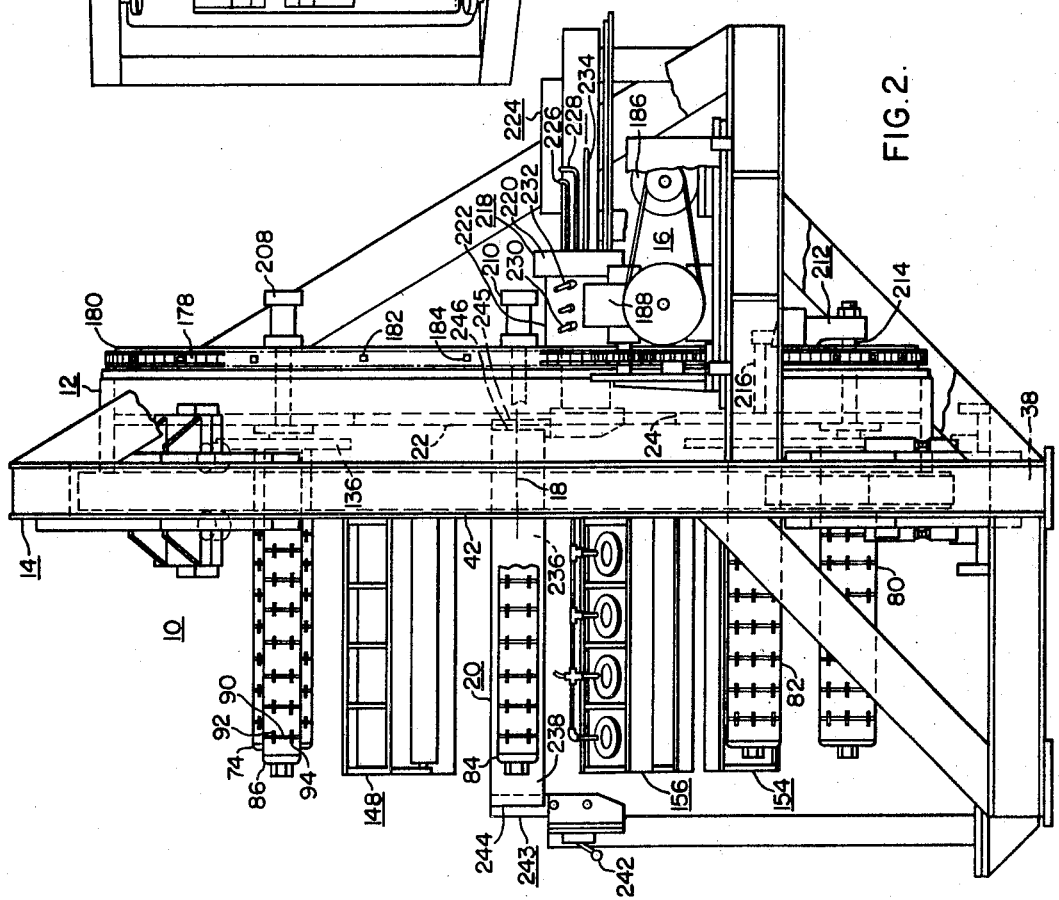
FIG. 2 is a side elevational view of the coil winding machine shown in FIG. 1.
Figure 3:
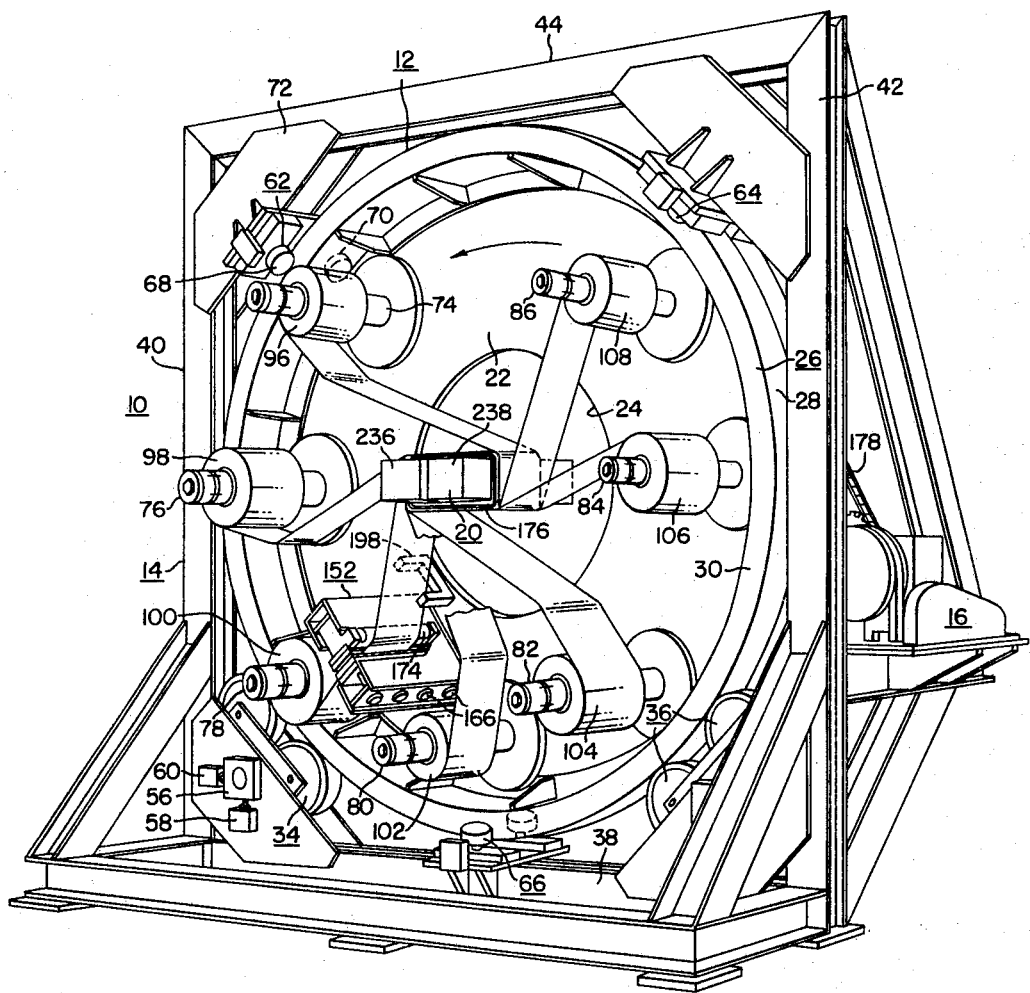
FIG. 3 is a perspective view of the coil winding machine shown in FIGS. 1 and 2.

Referring now to the drawings, FIGS. 1, 2 and 3 show front and side elevations, and a perspective view, respectively of a new and improved coil winding machine 10 constructed according to the teachings of the invention. In general, coil winding machine 10 includes rotatable carriage means 12 supported by support means 14. Drive means 16 is disposed to rotate carriage means 12 about rotational axis 18 of the carriage means 12. A mandrel 20, upon which the electrical coil is wound, is disposed along the rotational axis 18 of the carriage means 12, such that the axis of an electrical coil wound on the mandrel 20 will coincide with the rotational axis 18 of the carriage means 12.

In order to save floor space, and to facilitate the handling and placement of the rolls of supply material, as well as provide easy access to the mandrel by an operator, the carriage means 12 is disposed such that its axis of rotation 18 is horizontal.

Carriage means 12 includes a heavy disc or washer shaped plate member 22 having an inner opening 24, and a ring-shaped bearing structure 26 welded, or otherwise suitably attached, about its outer periphery. Bearing structure 26 has a cylindrical bearing surface 28, which forms the outer periphery of the carriage means 12, and guide surfaces 30 and 32 which are perpendicularly disposed to the cylindrical bearing surface 28 at each end thereof, and which extend inwardly toward the axis of rotation 18 for a predetermined short distance.

Support means 14 basically comprises support rollers, which contact the bearing surface 28 and support the weight of the carriage means 12 while allowing it to rotate, guide rollers which contact the guide surfaces 30 and 32 and prevent the carriage means 12 from moving along its rotational axis 18, and a structure for mounting the support and guide rollers.

More specifically, in the embodiment of the invention shown in FIGS. 1, 2 and 3, a suitably braced, substantially rectangular framework of structural beams may be constructed to support the rollers, including a bottom horizontally disposed beam 38, first and second upstanding beams 40 and 42 connected to the first and second ends, respectively, of beam 38, and an upper horizontally disposed beam 44 which has its first and second ends connected to the upwardly extending ends of first and second beams 40 and 42, respectively.

The support rollers, in this instance, include a first pair 34 mounted between beams 38 and 40, and a second pair 36 mounted between beams 38 and 42. The first pair 34 include rollers 46 and 48, rotatably mounted on shafts 47 and 49, respectively, which are fixed to a structure 50, and structure 50 has a shaft 52 which is rotatably mounted to a stationary structure 54, with structure 54 being fixed to beams 38 and 40. Thus, rollers 46 and 48 are free to rotate about their respective shafts, and pair of rollers 34 are free to rotate about the axis of shaft 52, to provide a load sharing balance between the rollers. Structures 50 and 54 are located such that an imaginary line drawn between the axes of shafts 47 and 49 will form an angle of approximately 45° with the horizontal beam 38. In order to provide a set-up adjustment for the location of the axis of shaft 52, eliminating the necessity of precision boring in the manufacture of the support means 14, the bearing blocks for providing support for shaft 52, such as block 56, may have vertical and horizontal jacking means 58 and 60, respectively, which position the shaft before the bolts for securing the block 56 are tightened.

The pair of rollers 36 are mounted in a manner similar to that hereinbefore described relative to pair 34, except they are mounted between beams 38 and 42, and thus need not be described in detail.

The guide rollers, in this instance, include a first pair 62 mounted between beams 40 and 44, a second pair 64 mounted between beams 42 and 44, and a third pair 66, shown most clearly in FIG. 3, mounted on beam 38. Since the guide rollers are similar in construction, only pair 62 will be described in detail. Pair 62 include rollers 68 and 70 rotatably mounted on a structure 72 which extends between beams 40 and 44. Rollers 68 and 70 are each mounted on shafts whose axes are perpendicular to the rotational axis 18 of carriage means 12. Rollers 68 and 70 are placed on opposite sides of carriage means 12, with their roller surfaces in contact with the guide surfaces 30 and 32, respectively. Thus, when carriage means 12 is rotated, it will be supported by the pairs 34 and 36 of support rollers, and it will be guided and confined by the pairs 62, 64 and 66 of guide rollers, preventing axial movement of the carriage means 12.

A plurality of pay-off spindles are mounted in predetermined, spaced, circumferential relation with one another, on the disc-like plate member 22 of the carriage means 12. In this instance, seven spindles are utilized, 74, 76, 78, 80, 82, 84 and 86, with their axes spaced 45° apart on a circle of predetermined radius having a center located at the rotational axis 18 of carriage means 12. An opening 88 is provided in plate member 22 for mounting another spindle, if required. The number of spindles required will depend upon the maximum number of sheet conductors which will be connected in parallel in a specific coil, and the number of layers of sheet insulation required to be disposed between each layer of parallel connected sheet conductors. In the embodiment of the invention shown in FIGS. 1, 2 and 3, the coil will have five sheet conductors connected in parallel, and thus five sheet conductors per coil turn, and two layers of sheet insulating material between each coil turn. In the event that each conductor is coated with an insulating material, such as with an epoxy resin system, the sheet insulation would not be required.

The plurality of pay-off spindles are adapted to each receive a roll of sheet material, with spindles 74, 76, 78, 80 and 82 being adapted to receive rolls 96, 98, 100, 102, and 104, respectively, of sheet conductor, such as copper or aluminum, and spindles 84 and 86 being adapted to receive rolls 106 and 108, respectively, of sheet insulation, such as paper. In order to enable the rolls to be easily telescoped over the spindles, and to allow the empty roll-forms to be easily removed from the spindles after the sheet material has been removed, and yet prevent the rolls of sheet material from rotating relative to their associated spindles when the sheet material is being pulled from the rolls during the winding process, each spindle includes a plurality of sets of tilt type locking teeth, with each set being circumferentially spaced about the periphery of its associated spindle. For example, as shown most clearly in FIG. 2, spindle 86 may have a plurality of circumferential grooves, such as circumferential groove 90, and a plurality of discrete, spaced, longitudinal grooves, such as grooves 92 and 94, disposed to intersect each circumferential groove. Tilt type locking teeth are disposed in each of the discrete longitudinal grooves, and they are held in place by a wire disposed in each of the circumferential grooves. The rolls of sheet material 96, 98, 100, 102, 104, 106 and 108 are each wound on a metallic tubular, cylindrical pipe form 110, 112, 114, 116, 118, 120 and 122, respectively. The tilt lock teeth are depressed slightly within their grooves, allowing a roll of sheet material to be telescoped over their associated spindles. The teeth are placed such that when the sheet is removed from the rolls by turning the roll counterclockwise when facing the front elevational view of the winding machine 10, such as shown by the arrow 75 on spindle 74 in FIG. 1, the teeth will tilt and extend outwardly from the spindle, biting into the metallic pipe form upon which the sheet material is wound, causing the roll and spindle to rotate together. When the sheet material has been removed from the roll, the pipe form may be rotated clockwise, opposite to the direction of the arrow on the spindles in FIG. 1, which will cause the teeth to be depressed and release their hold on the pipe form, allowing it to be removed and a new roll to be placed in position on the spindle.

In order to prevent the rolls from unrolling when the rate of sheet removal is reduced, and due to any tendency of the sheet to unwind by itself, and also to provide a predetermined amount of tension in the sheet material for purposes which will be hereinafter explained, each spindle includes adjustable drag means which resists the turning of the spindle. In the embodiment of the invention shown in FIGS. 1, 2 and 3, the adjustable drag means is provided by an adjustable disc brake, with spindles 74, 76, 78, 80, 82, 84 and 86 having disc brakes 124, 126, 128, 130, 132, 134 and 136 respectively. The disc brakes may be air operated as illustrated, with each disc brake, such as disc brake 126, having adjustment means 138 and indicating means 140, as shown in FIG. 1, for setting the desired predetermined drag.

As will be hereinafter expalined, each spindle is provided with means for axially moving the spindle and its associated disc brake. The torque arm for each disc brake thus must be allowed to move with the axial movement of the spindle, while being fixed circumferentially. As shown in FIG. 1, this may be accomplished by disposing a roller on the end of each torque arm, which has a rotational axis which is perpendicular to the rotational axis of its associated spindle, and by restraining the roller within hardened ways positioned to allow the torque arm to move with the axial movement of the spindle, and to prevent the torque arm from rotating about the rotational axis of its associated spindle. More specifically, each disc brake has a torque arm, such as torque arm 142 on disc brake 126, having a roller 144 mounted on its extended end, which is restrained circumferentially by hardened ways 146, but which may roll within the ways when the spindle and brake move axially.

The tension in the sheet material provided by the disc brakes on the spindles resisting the rotation of the spindles, is sufficient for the sheet insulating material, but the disc type brake, in general, is not adequate for providing the desired tension in the sheet conductor material. This is due to the fact that the sheet insulating material comes with a good tight wrap in the rolls, while the wrap in the rolls of conductive material may be less than optimum. Thus, the sheet tension will vary as the sheet conductor is unrolled due to non-uniformities in its wrap. Even if the sheet conductor were available with a uniform wrap, the braking system would be complicated by the fact that as the roll diameter decreases, it would become increasingly more difficult to rotate the spindle, thus increasing the strip tension. To offset this, the braking force would have to be automatically decreased as the roll diameter is reduced, which would increase the complexity and cost of the braking system.

Therefore, in order to provide the desired predetermined tension in the sheet conductors, each sheet conductor is passed through tension means, after it has been unrolled from its associated roll, just prior to its being wound about the mandrel. Since the sheet is unrolled at the time the tension is applied thereto, the tension is independent of the tightness of the wrap of the conductor in the roll, and independent of the roll size.

More specifically, each spindle adapted to receive rolls of sheet conductor material, has tension means disposed between it and the mandrel 20, with spindles 74, 76, 78, 80 and 82 having tension means 148, 150, 152, 154 and 156 associated therewith, respectively. Only tension means 152 is shown in the perspective view of FIG. 3, in order to more clearly illustrate the winding of the sheet materials on the mandrel 20.

Figure 4:
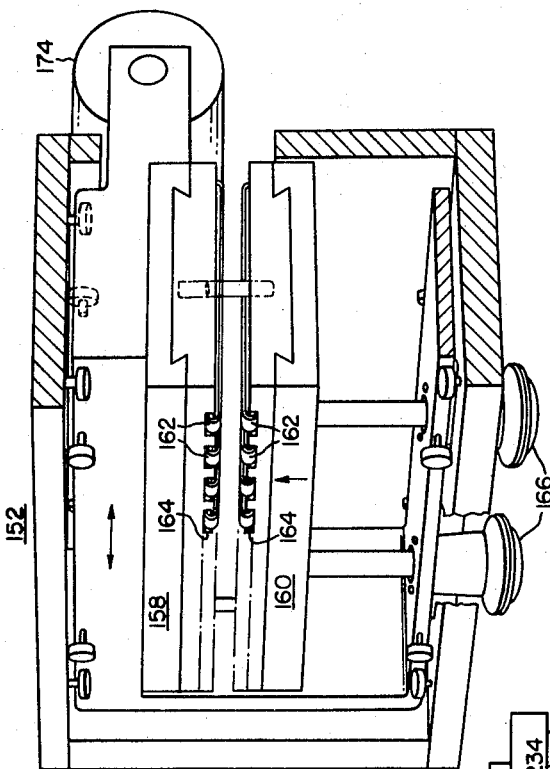
FIG. 4 is a perspective view of sheet tensioning means which may be used in the coil winding machine shown in FIGS. 1, 2 and 3.

Since each of the tension means are similar, only tension means 152 will be described in detail. Tension means 152 is shown in an enlarged perspective view in FIG. 4, in order to more clearly illustrate its functional components.

In general, tension means 152 is of the friction-clamp type, but instead of pulling the sheet through the tension means, with the sheet moving relative to the portion of the tension means in contact with the strip, which is common in prior art tension means, tension means 152 is constructed such that there is no relative motion between the strip and the portion of the tension means contacting the strip. As shown most clearly in FIG. 4, tension means 152 includes first and second rotatable means 158 and 160 disposed in spaced relation such that the sheet conductor may be passed between them. Each of the rotatable means includes a plurality of endless slip belts 162 disposed to rotate in hardened wear plates 164 when the rotatable means 158 and 160 are clamped with a predetermined pressure on the conductive sheet material as it is being pulled from its roll. An adjustable clamping force may be applied to the sheet material by the first and second rotatable means by a plurality of air cylinders 166 which force rotatable means 160 and the sheet conductor against rotatable means 158. As shown in FIG. 1, tension means 152 may include an adjustment valve 168 and indicating means 170, connected to the air cylinders 166 and to a source of compressed air, for adjusting the tension on the sheet or strip conductor. When the air cylinders 166 force rotating means 160 in the direction of rotating means 158, the sheet conductor is held between the plurality of slip belts 162. The strip must then be pulled to overcome the friction between the slip belts 162 and their associated wear plates 164. The force necessary to pull the strip through the tension means 152, while rotating the slip belts, determines the tension developed in the sheet conductor, and this may be adjusted by changing the force applied by the air cylinders 166.

The sheet material from the various pay-off spindles which contain the conductive strip material are each drawn through their associated tension means and secured to mandrel 20. The sheet material from the pay-off spindles which contain the insulating material are then fixed to the mandrel. The carriage means 12 may then be rotated by drive means 16, counterclockwise as illustrated by arrow 12 in FIG. 1, causing the spindles to rotate counterclockwise and wrap or wind their associated sheet materials about the stationary mandrel 20. The disc brakes associated with the spindles provide the necessary tension in the sheet insulating material to provide a tight wrap and desired space factor of the insulating materials, they provide the desired tension on the sheet conductors as they enter their associated tension means, and they provide a drag which prevents the spindles from rotating faster than they are being forced to, in order to prevent the sheet materials from unrolling at will. A carriage r.p.m. counter (not shown), indicates the number of conductor turns applied to the mandrel, and it may be used to notify the operator when duct formers should be placed in the coil build, to enable cooling fluid to be passed through the conductor turns when the coil is subsequently placed on a magnetic core, and the magnetic core-coil assembly disposed in a tank containing the cooling fluid. The r.p.m. counter also indicates when the coil contains the desired number of conductor turns, and should be removed from the mandrel 20.

Disposing the mandrel 20 along the rotational axis 18 of carriage means 12, and spacing the pay-off spindles circumferentially about the mandrel 20, provides a substantial balance in the forces being applied to the mandrel 20 by each of the sheet materials. This balancing of the forces simplifies the anchoring structure for the mandrel, and eliminates the problems created due to mandrel deflection. Further, the contact points between the sheet materials and the coil, as the sheet materials are being applied to the coil build, are separated from one another. Thus, each sheet material easily bends and conforms to the contour of the mandrel and coil build, just as though it were the only sheet being applied thereto. Manual hammering of the conductive strip material around the coil contour is thus eliminated, allowing continuous winding of the coil, which reduces manufacturing time and reduces its manufacturing cost.

Each of the tension means, such as tension means 152, includes a roller 174 to guide and direct the sheet material as it leaves the slip belts of the tension means. Each of the tension means is disposed such that the direction of the sheet as it leaves the slip belts, and the direction of the sheet as it leaves the roller 174 to proceed to its "rotating" contact point on the mandrel or coil build, provides an angle which prebends the sheet conductor material in a direction which causes the conductor to lie tightly against the preceding layer of sheet material In other words, the prebending of the sheet conductor causes the sheet to bend inwardly towards the axis of the coil, overcoming any tendency of the conductive sheet material to bend outwardly This assures a tight wrap and maximum space factor for the finished coil, such as the coil 176 shown being wound on the mandrel 20 in FIGS. 1 and 3. FIG. 2 illustrates the winding machine 10 without sheet material disposed on the spindles, in order to more clearly illustrate the spindles and their construction in the side elevational view.

Overcoming the drag on the sheet materials provided by the disc brakes and the tension means requires a substantial torque, and therefore a large gear reduction from the drive means 16 to the carriage means 12. The construction of winding machine 10 lends itself to provide this gear reduction inexpensively, by driving the carriage from a point near its outer periphery. The drive means 16 may be coupled to the carriage means through a chain 178. Carriage means 12 may include a cylindrical projection 180 which extends outwardly from the carriage means 12, in a direction opposite to the direction of the projecting spindles, with the cylindrical projection 180 being coaxial with the axis of rotation 18 of the carriage means 12. The cylindrical projection may include a plurality of spaced dogs or teeth, such as dogs 182 and 184, which engage the openings in the chain 178 and allow the chain to drive the carriage means 12 at an r.p.m. which is substantially less than the r.p.m. of the driving gear of the drive means 16. Drive means 16 may include a drive motor 186 coupled to a right angle worm gear motor 188, through a pulley and belt arrangement. The chain 178 is pulled over an idler gear 190 and into the driven output gear 192 of the gear motor 188. The massive gear reduction inherent in the disclosed construction, permits a drive motor having a relatively small horsepower rating to be used. For example, on a seven spindle coil winding machine, having the spindles disposed about the periphery of a 100 inch diameter circle, capable of winding electrical coils out of sheet conductors each having a width up to 40 inches and a thickness dimension up to .0625 inch, a 5 horsepower drive motor is adequate.

In winding the plurality of layers of sheet material on mandrel 20, it is important that the sheet materials be wound straight throughout the coil build. For example, the edges of the sheet conductor should be square, and the edges of the sheet insulating material, which extend outwardly past the edges of the sheet conductors in order to provide edge insulation, should also be square. In this embodiment of the invention, edge control means is provided which senses the location of an edge of each of the sheet materials, immediately prior to its being wrapped about the mandrel 20, and which controls the axial position of each of the spindles to provide the straightness of wind required. Since the spindles must be capable of moving axially in either direction, more accurate control over the spindles may be obtained by using hydraulic cylinders, than by using air cylinders. Thus, as shown most clearly in FIG. 1, the sheet material from each of the pay-off spindles is passed through a photocell and light source arrangement, with spindles 74, 76, 78, 80, 82, 84 and 86 having an associated photocell and light arrangement 194, 196, 198, 200, 202, 204 and 206 respectively. The photocell arrangement provides an error signal when the sheet edge moves from its desired location, with the error signal being used to move the spindle inwardly or outwardly, depending upon the direction of the deviation of the sheet material from its desired position. Hydraulic cyliners 208 and 210, shown in FIG. 2, are used to control the axial positions of the spindles 86 and 84, respectively, which spindles are adapted to receive the insulating sheet material. Each of the spindles adapted for receiving the conductive sheet materials include a hydraulic cylinder and mechanical linkage arrangement, adapted to not only move its associated spindle axially, but also its associated tension means. For example, spindle 80 has a hydraulic cylinder and linkage arrangement 212 which actuates spindles 80 via shaft 214, and its associated tension means 154 via shaft 216.

An alternative to axially moving the spindles in response to the edge control means, would be to pass the sheets over deflection rolls, with the deflection being responsive to the edge control means.

As hereinbefore described, the disc brakes associated with each of the pay-off spindles also moves with each spindle when it is moved axially, with each disc brake including the hereinbefore described means for allowing its torque arm to move with the axial movement of the spindle, while preventing rotational movement of the torque arm.

Carriage means 12 requires compressed air for the operation of the disc brakes and tension means, hydraulic fluid for operating the hydraulic cylinders which control the axial locations of the pay-off spindles, and electrical power for the photocell and light source arrangements which provide signals for operating the hydraulic cylinders. These services may be introduced to the carriage means through a rotary seal 218. Rotary seal 218 has a stationary portion 220 and a rotary portion 222. Rotary portion 222 rotates with the carriage means 12, via a suitable mechanical linkage (not shown), such as an arm which is fixed to the rotary portion 222, and which extends outwardly to the carriage where it is engaged by a suitable driving dog or cam. A hydraulic system 224 may provided which has pipes 226 and 228 connected to the stationary portion 220 of the rotary seal 218, directing the hydraulic fluid through pipe 226, through the seal, and outwardly from hose 230 on rotary portion 222, where it proceeds to a ring type supply manifold (not shown). The hydraulically operated cylinders are connected to the supply manifold, and they return the hydraulic fluid to a ring-type return manifold, (not shown) which is connected to rotary portion 222 of the rotary seal 218, via hose 232. The returning hydraulic fluid is directed through the seal, where it returns to the hydraulic system 234 via pipe 228.

Compressed air may be directed into the stationary portion 220 of rotary seal 218 via pipe 234, through a rotary air seal, and to a ring type supply manifold (not shown) on the carriage means 12. Each of the air operated devices are connected to the ring type air supply manifold.

Electrical power may be introduced to the carriage means 12 by disposing stationary collector rings (not shown) within the stationary portion 220 of rotary seal 218, with the rotary portion of the seal having conductors (not shown) connected to the collector rings via brushes which are in contact with the collector rings.

The mandrel 20 may be split into first and second similar portions 236 and 238, which facilitates the removal of the finished coil 176 from the mandrel 20. The relative spacing between the two halves 236 and 238 of the mandrel 20 may be controlled by front and rear mandrel actuator support means 243 and 245, respectively, with adjustment arm 240 controlling the spacing of the mandrel halves at end 244 of the mandrel, and adjustment arm 242 controlling the spacing of the mandrel halves at end 246 of the mandrel. Thus, the opening or coil window dimension W may be adjusted to any value within the adjustment range without changing mandrels. If the coil window requires a dimension perpendicular to the dimension W different than that of the mandrel being used, a different mandrel may be placed in position on the mandrel actuator support means 243 and 245, and its two halves controlled to provide the desired dimension W. After the coil 176 has been completed, it may be easily removed from the mandrel 20 by moving the mandrel halves 236 and 238 towards each other, which releases the grip of the coil on the mandrel.

In the operation of the winding machine 10, rolls of sheet material are telescoped over the spindles, with rolls of electrically conductive material being telescoped over spindles 74, 76, 78, 80 and 82, and rolls of insulating sheet material being telescoped over spindles 84 and 86. The mandrel 20 is disposed on the front and rear mandrel actuator supports 243 and 245, and its spacing adjusted by adjustment arms 240 and 242 to the desired dimension. The electrically conductive strips from rolls 96, 98, 100, 102 and 104 are threaded through their associated tension means, and through their associated guide means, and attached to the mandrel by welding the ends of all conductors to a power lead, which in turn is clamped to the mandrel 20 by clamping means (not shown), designed to accept the desired power lead. In like manner, the insulating sheet materials from rolls 104 and 106 are threaded through their associated edge guide means and attached to the mandrel by pressure sensitive tape. The drive means 16 may then be actuated by the operator through suitable control means (not shown), such as a foot switch or remote control console, which rotates the carriage means 12 counterclockwise at a suitable speed, such as 2 r.p.m., while the carriage is supported on its outer periphery by roller assemblies 34 and 36, and guided by roller assemblies 62, 64 and 66. As the carriage means 12 is rotated, the sheet materials are pulled from the rolls on the spindles, rotating the rolls and their associated spindles counterclockwise to overcome the drag provided by the disc brakes and to overcome the drag provided by the slip belts in the tension means associated with the sheet conductive materials, to provide the desired tension in the sheet materials as they are being wound about the mandrel 20. The sheet materials are wound with their edges in predetermined relation relative to the mandrel, since each of the sheet materials are controlled by their associated edge guide means, which in turn control the axial positions of the spindles to provide the desired tracking of the sheet materials as they are being wound about the mandrel. An r.p.m. counter counts the revolutions of the carriage, signaling the operator when to add duct formers, and when the coil is completed.

Coil winding machine 10 overcomes the disadvantages of the prior art winding machines for winding large coils of conductive sheet material, by moving the rolls of sheet material about a stationary mandrel disposed substantially at the rotational axis of the carriage carrying the rolls of sheet material. The forces applied to the mandrel are thus substantially balanced, simplifying the mounting of the mandrel while eliminating the deflection and alignment problems of prior art winding machines. Further, the tension in each of the strip materials is uniform, each strip is of the same length, and each is applied such that its contact point with the mandrel and coil build is spaced from the contact points of the other sheet materials. Thus, each sheet material easily bends to conform to the coil contour, providing a maximum space factor. The electrically conductive sheet materials are given a prebend opposite to the bend they will assume after they are wound upon the coil, in order to force the sheet material inwardly toward the axis of the coil to insure a maximum coil space factor.

The tension means for developing the desired tension in the electrically conductive sheet material functions without relative motion between the conductive material and the portion of the tension means in contact with the conductive materials. Thus, the sheet is not deformed, scratched or otherwise damaged, allowing conductive sheet material coated with electrical insulation to be used, if desired.

Since numerous changes may be made in the above described apparatus and different embodiments of the invention may be made without departing from the spirit thereof, it is intended that all matter contained in the foregoing description or shown in the accompanying drawings shall be interpreted as illustrative and not in a limiting sense.

We claim as our invention:

1. A winding machine for winding an electrical coil from sheet material, comprising:
   rotatable carriage means;
   support means for said carriage means;
   drive means for rotating said carriage means;
   a plurality of pay-off spindles rotatably mounted at predetermined spaced circumferential positions about said carriage means, with the rotational axes of said spindles being parallel with the rotational axis of said carriage means, said spindles each being adapted to receive a roll of sheet material;
   a mandrel disposed at the rotational axis of said carriage means, about which sheet material disposed on said spindles may be wound when said drive means rotates said carriage means;
   tension means adapted to control, to a predetermined magnitude, the tension in at least certain of the sheet materials as they are being wound about said mandrel;
   and edge control means adapted to sense and control the location of an edge of each of the sheet materials as they are being wound about said mandrel from said spindles.

2. The winding machine of claim 1 wherein said carriage means is substantially disc shaped, having a bearing surface disposed about its outer periphery; and said support means includes roller means which contact said bearing surface, supporting said carriage means with its rotational axis substantially horizontally disposed, and allowing said carriage means to rotate when driven by said drive means.

3. The winding machine of claim 2 wherein said support means includes additional roller means which contact opposite sides of said disc shaped carriage means at predetermined circumferentially spaced locations adjacent its outer periphery, preventing axial movement of said carriage means while it is being rotated by said drive means.

4. The winding machine of claim 2 wherein said drive means contacts said disc shaped carriage means near its outer periphery, inherently providing the major portion of the gear reduction from said drive means which is necessary to wind an electrical coil on said mandrel while said tension means is providing the predetermined tension in the strip materials necessary to provide the desired coil shape and space factor.

5. The winding machine of claim 1 wherein said plurality of spindle and tension means are disposed to substantially balance the forces on said mandrel while the strip materials are being wound thereon.

6. The winding machine of claim 1 wherein the sheet material said plurality of spindles are adapted to receive is insulated electrical sheet conductor, and said tension means is adapted to control the tension in all of the insulated sheet conductors as they are being wound on said mandrel.

7. The winding machine of claim 1 wherein the sheet material includes electrically conductive sheet material and insulating sheet material, with certain of said spindles being adapted to receive rolls of electrically conductive sheet material and certain of said spindles being adapted to receive rolls of insulating sheet material, and said tension means is adapted to control the tension in the electrically conductive sheet materials as they are being wound on said mandrel.

8. The winding machine of claim 1 wherein said plurality of spindles include a plurality of tilt type locking teeth, which allow rolls of sheet material to be placed on said spindles, and allow the rolls to be turned on said spindles only in the direction which is opposite to the circumferential direction in which said spindles are turned while they are paying off sheet material being wound on said mandrel.

9. The winding machine of claim 1 including means for applying a predetermined drag to each of said spindles.

10. The winding machine of claim 9 wherein said drag means includes adjustable braking means on each of said spindles.

11. The winding machine of claim 1 wherein said mandrel includes means for adjusting at least one of its dimensions, to enable coil sides to be readily changed, and to facilitate removal of a finished coil from the mandrel.

12. The winding machine of claim 1 wherein the tension means for each of the sheet materials whose tension is to be controlled includes first and second rotatable means disposed to contact the sheet material on opposite sides thereof, respectively, and means for adjusting the force required to pull the sheet material through said first and second rotatable means while preventing relative movement between the portions of said first and second rotatable means in contact with the sheet material, and the sheet material itself.

13. The winding machine of claim 12 wherein said first and second rotatable means each include a plurality of endless slip belts disposed in wear plate holding means, and wherein the means for adjusting the force required to pull the sheet material through said first and second rotatable means includes means for clamping the sheet material between said first and second rotatable means with an adjustable clamping force, with the pulling force applied to the sheet material necessary to overcome the friction between said slip belts and said wear plate holding means, to move the sheet material and slip belts together, providing the tension in the sheet material.

14. The winding machine of claim 1 wherein the edge control means for controlling the edge position of the sheet materials associated with each of said spindles includes photocell and light source means disposed to provide signals responsive to the position of the edge of the sheet materials, and means for axially moving each of the spindles, said means for axially moving said spindles each being responsive to the signal from its associated photocell and light source means, to move the spindle as required to maintain the edge of the sheet material at a predetermined location.

15. The winding machine of claim 1 wherein certain of the functions on said carriage means require pressurized fluid and electrical power for their operation, and including rotary seal means for introducing the pressurized fluid and electrical power to said carriage means.

16. The winding machine of claim 1 including roller means disposed between said tension means and said mandrel adapted to bend at least certain of the sheet materials on a radius which forces the sheet material against the immediately preceding coil turn, to provide an electrical coil having a tighter wind.

References Cited

UNITED STATES PATENTS

| | | | |
|---|---|---|---|
| 3,112,556 | 12/1963 | Zack | 29—605 |
| 3,234,063 | 2/1966 | Masini | 29—605 X |
| 3,252,118 | 5/1966 | Hughes. | |
| 3,380,675 | 4/1968 | Baxter et al. | 242—7.21 |
| 3,392,933 | 7/1968 | Singh | 57—10 X |

MILTON S. MEHR, Primary Examiner

U.S. Cl. X.R.

29—605; 57—10; 242—7.08